United States Patent
Mahe et al.

(10) Patent No.: US 7,652,812 B2
(45) Date of Patent: Jan. 26, 2010

(54) METHOD OF POWERING AN ELECTRICALLY-CONTROLLED DEVICE WITH VARIABLE OPTICAL AND/OR ENERGY PROPERTIES

(75) Inventors: Erwan Mahe, Guerande (FR); Fabien Beteille, Revel (FR); Carinne Fleury, Saint Prim (FR); Emmanuel Valentin, Le Plessis Trevise (FR); Xavier Fanton, Aulnay sous Bois (FR)

(73) Assignee: Saint-Gobain Glass France, Courbevoie (FR)

( * ) Notice: Subject to any disclaimer, the term of this patent is extended or adjusted under 35 U.S.C. 154(b) by 166 days.

(21) Appl. No.: 11/547,867

(22) PCT Filed: Apr. 7, 2005

(86) PCT No.: PCT/FR2005/050218

§ 371 (c)(1), (2), (4) Date: Jan. 19, 2007

(87) PCT Pub. No.: WO2005/103807

PCT Pub. Date: Nov. 3, 2005

(65) Prior Publication Data

US 2008/0018979 A1    Jan. 24, 2008

(30) Foreign Application Priority Data

Apr. 9, 2004   (FR) .................................. 04 03800

(51) Int. Cl.
G02F 1/15   (2006.01)

(52) U.S. Cl. ..................... 359/265; 396/457; 345/105

(58) Field of Classification Search .................. 359/265; 345/105; 396/457
See application file for complete search history.

(56) References Cited

U.S. PATENT DOCUMENTS

| 4,205,903 | A | 6/1980 | Inami et al. |
| 6,362,806 | B1 * | 3/2002 | Reichmann et al. ......... 345/105 |
| 2004/0061919 | A1 | 4/2004 | Tench et al. |

FOREIGN PATENT DOCUMENTS

| EP | 0 638 835 | 2/1995 |
| JP | 58 125018 | 7/1983 |
| JP | 61 254935 | 11/1986 |
| WO | 98 16870 | 4/1998 |

OTHER PUBLICATIONS

U.S. Appl. No. 11/817,685, filed Sep. 4, 2007, Fanton, et al.
U.S. Appl. No. 11/547,867, filed Jan. 19, 2007, Mahe, et al.

* cited by examiner

Primary Examiner—Joseph Martinez
(74) Attorney, Agent, or Firm—Oblon, Spivak, McClelland, Maier & Neustadt, L.L.P.

(57) ABSTRACT

A method of supplying an electrically controllable system having variable optical/energy properties in transmission or in reflection, including at least one carrier substrate with a multilayer that allows migration of active species, including at least two active layers separated by an electrolyte, the multilayer being placed between two electrodes connected respectively to upper and lower current leads respectively. In addition to a constant first energy potential, a time-varying second energy potential is applied between the current leads, the first and second energy potentials being designed to ensure switching between two states having different optical/energy properties in transmission or reflection.

22 Claims, 3 Drawing Sheets

METHOD OF POWERING AN ELECTRICALLY-CONTROLLED DEVICE WITH VARIABLE OPTICAL AND/OR ENERGY PROPERTIES

CROSS-REFERENCE TO RELATED APPLICATIONS

The present application is the U.S. counterpart of WO 2005/103807, and in turn claims priority to French Application No. 04/03800 filed on Apr. 9, 2004, the entire contents of each of which are hereby incorporated herein by reference.

The present invention relates to a method of supplying an electrically controllable device having variable optical and/or energy properties. It relates more particularly to devices that use electrochromic systems operating in transmission or in reflection.

Electrochromic systems have been extensively studied. They are known to comprise in general two layers of electrochromic materials that are separated by an electrolyte and flanked by two electrodes. Each of the electrochromic layers, under the effect of an electrical supply, can inject charges reversibly, the change in their oxidation state as a result of these injections/ejections resulting in a change in their optical and/or thermal properties (for example, in the case of tungsten oxide, a switch from a blue color to a colorless appearance).

Switching the electrically controllable system consists of a complex electrochemical process defined by a charge transfer (electrical migration of the charged species (ions and electrons) within a thin-film multilayer a few hundred nanometers in thickness) and a mass transfer, associated with the displacement of the charged species into the multilayer.

This switching is characterized by the contrast of the electrically controllable system, by the uniformity of the coloration, by the switching speed and by the preservation of these functional properties after several coloration/bleaching cycles, namely the durability.

The manufactures of electrically controllable systems have developed techniques for improving all of these characteristics, so as to obtain an optimized electrically controllable system.

Thus, better contrast is achieved by both improving and balancing the charge capacity of the functional layers of the multilayer; uniformity and switching speed are improved by optimizing the conductivity of the conducting layers forming the electrodes that connect the upper and lower active layers of the multilayer; using a network of tungsten wires for feeding the current to the upper electrode helps to improve uniformity. All these solutions result in a durability corresponding to several tens of thousands of cycles, which is generally representative of the lifetime of the system.

Although these systems are entirely satisfactory, the manufacturers have noticed that when these are integrated into large substrates (with an active area of around 1 to 2 m$^2$), the parameters such as uniformity and coloring speed are no longer optimal and that, in particular, the switching speed of the substrate is inversely proportional to the size of the substrate.

The inventors have discovered, quite surprisingly, that it is possible to model an electrically controllable system of this type as an electrical system characterized by its individual resistors and capacitors, and therefore generally its charge loss or its impedance.

The presentation invention therefore aims to alleviate the drawbacks of the prior techniques by proposing a method of supplying an electrically controllable system that compensates for these charge losses and therefore maintains, or even improves, the abovementioned functional properties, even for large electrically controllable systems.

For this purpose, the method of powering an electrically controllable system having variable optical/energy properties in transmission or in reflection, comprising at least one carrier substrate provided with a multilayer that allows migration of active species, especially an electrochromic multilayer comprising at least two active layers, which are separated by an electrolyte, the said multilayer being placed between two electrodes connected respectively to current leads, namely the upper and lower current leads respectively ("lower" corresponding to the current lead closest to the carrier substrate, as opposed to the "upper" current lead that is furthest from said substrate), is characterized in that, in addition to a constant first energy potential P1, P1', a time-varying second energy potential P2, P2' is applied between the current leads, said first and second energy potentials being designed to ensure switching between two states E1 and E2 having different optical/energy properties in transmission or reflection.

In preferred embodiments of the invention, one or more of the following arrangements may optionally be furthermore employed:

the constant potentials P1 and P1' are defined according to the diffusion properties of the active species in the multilayer;

the potentials P2 and P2' are defined so as to force the migration of the active species into the multilayer;

the energy potentials P1 and P2 are applied in order to switch from the state E1 to the state E2;

the energy potentials P'1 and P'2 are applied in order to switch from the state E2 to the state E1;

the energy potentials P1, P1', P2, P2' are electrical potentials;

the energy potentials P1, P1', P2, P2' are chosen from voltage, current or charge sources, taken individually or in combination;

the second energy potential P2, P2' consists of at least one constant pulse;

the second potential is of the pulsed, log(t), (1/t) or at+b form or is in the form of a polynomial $$P(t) = \sum_i a_i \cdot t^i,$$

where $a_i$ is positive or negative, or a linear or nonlinear combination of these forms;

the second potential is such that the current or voltage response is constant at any instant and equal to an initially chosen value;

the second potential is such that the product of the potential and the current is constant at any instant and equal to an initially chosen value (this corresponds to a constant power regime);

the second potential is such that the ratio of the potential to the current is constant at any instant and equal to an initially chosen value (this corresponds to a constant impedance regime);

P1 and P2 are positive or zero;

P1 and P2 are of opposite sign;

P1' and P2' are negative or zero;

P1' and P2' are of opposite sign;

the potentials P1, P2, P'1, P'2 are compared with maximum potentials P1$_{max}$, P2$_{max}$, P'1$_{max}$, P2'$_{max}$ respectively, these potentials being determined as limiting values away from which the functionality of the system is no longer optimum;

it is applied to an electrically controllable system of the electrochromic type, switching taking place between the colored state E1 and the bleached state E2;

the energy potentials are applied between the current leads by a manual actuator; and the energy potentials are applied between the current leads by an automatic actuator optionally coupled to a detector.

The invention will be described in greater detail with regard to the appended drawings in which.

Figure 1:
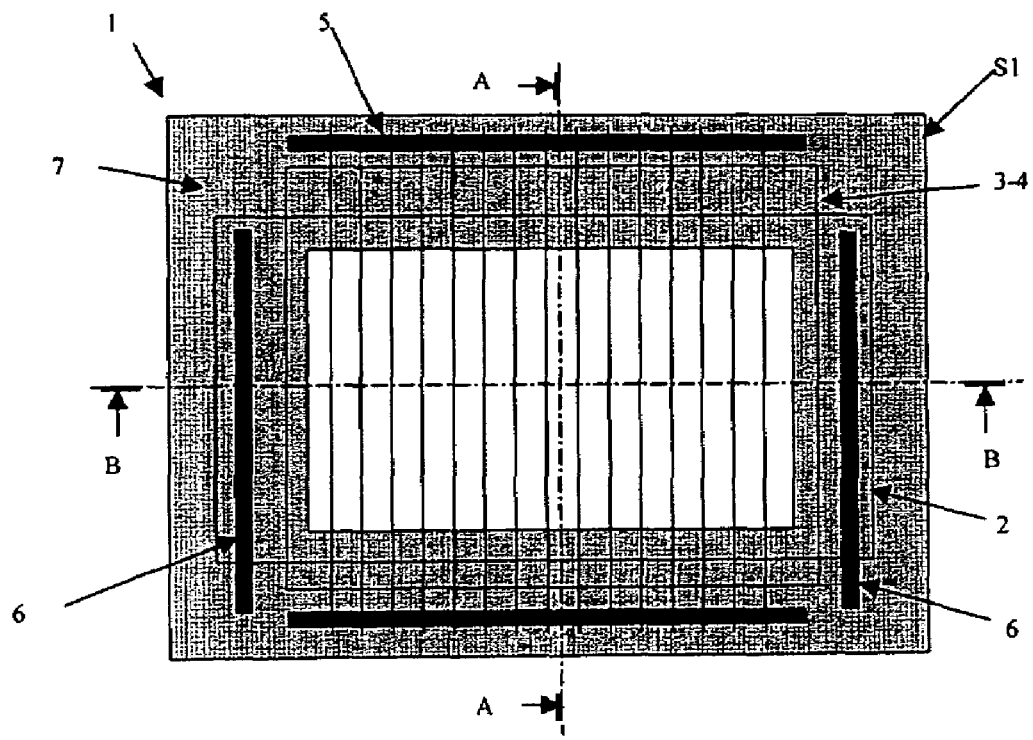
FIG. 1 is a front view of the face 2 of a glazing unit that incorporates an electrically controllable system, especially one of the electrochromic type, which can be supplied using the method according to the invention.

In a preferred embodiment of an electrically controllable system, for example of the electrochromic type, allowing the supply method according to the invention to be implemented, it comprises an all-solid-state electrochromic thin-film multilayer made up of an active multilayer 3 placed between two current collectors 2 and 4. The collector 2 is intended to be in contact with the face 2. A first array of conducting wires 5 (visible in FIG. 1) or an equivalent device is used to supply the collector 4 with electric current; a second array of conducting wires 6 (also visible in FIG. 1) or an equivalent device allows the lower collector 2 to be supplied with electric current.

The collectors 2 and 4 and the active multilayer 3 may have either substantially identical sizes and shapes, or substantially different sizes and shapes, and it will then be understood that the path of the collectors 2 and 4 will be adapted according to the configuration. Moreover, the sizes of the substrates, in particular S1 may be essentially greater than those of 2, 4 and 3.

The collectors 2 and 4 are of the metal type or of the TCO (Transparent Conductive Oxide) type made of ITO, F:$SnO_2$ or Al:ZnO, or they may be a multilayer of the TCO/metal/TCO type. Depending on the configurations, they may be omitted and, in this case, the current leads 5 and 6 are directly in contact with the active multilayer 3.

A preferred embodiment of the collector 2 is formed by depositing, on the face 2, a 50 nm SiOC first layer surmounted by a 400 nm F:$SnO_2$ second layer (the two layers preferably being deposited, in succession, by CVD on the float glass before cutting).

A second embodiment of the collector 2 is formed by depositing, on face 2, a bilayer consisting of an $SiO_2$-based first layer which may or may not be doped (especially doped with aluminum or boron) about 20 nm in thickness surmounted by the an ITO second layer of about 100 to 600 nm in thickness (the two layers being preferably deposited, in succession, under vacuum, by reactive magnetron sputtering in the presence of oxygen, possibly carried out hot).

Another embodiment of the collector 2 is formed by depositing, on face 2, a monolayer made of ITO about 100 to 600 nm in thickness (a layer preferably deposited, under vacuum, by reactive magnetron sputtering in the presence of oxygen, possibly carried out hot).

The collector 4 is an ITO layer with a thickness of 100 to 500 nm, also deposited, on the active multilayer, by reactive magnetron sputtering.

In FIG. 1, the current leads 5 are metal wires connected to metal shims. The metal wires are for example made of tungsten (or copper or molybdenum), said wires being optionally coated with carbon, partially oxidized, with a diameter of between 10 and 100 µm and preferably between 20 and 50 µm, these being straight or corrugated, and deposited for example on a PU sheet using a technique known in the field of wire-based heated windshields, for example that described in patents EP-785 700, EP-553 025, EP-506 521, EP-496 669.

One of these known techniques consists in using a heated press roll that presses the wire against the surface of polymer sheet, this press roll being supplied with wire from a feed spool via a wire-guide device.

As is known, the metal shims are copper strips optionally coated with a tin alloy, with a total thickness of typically 50 µm and with a width of between 3 and 8 mm.

The current leads according to another embodiment are obtained by a screen-printing technique, the leads being directly deposited on the enameled regions of the face 2. This screen printing, especially based on silver, may also be deposited on the ITO layer. A conductive paste may also act as a current lead and, in this case, it is in contact with the ITO layer or with the enamel layer present on face 2.

Figure 2:
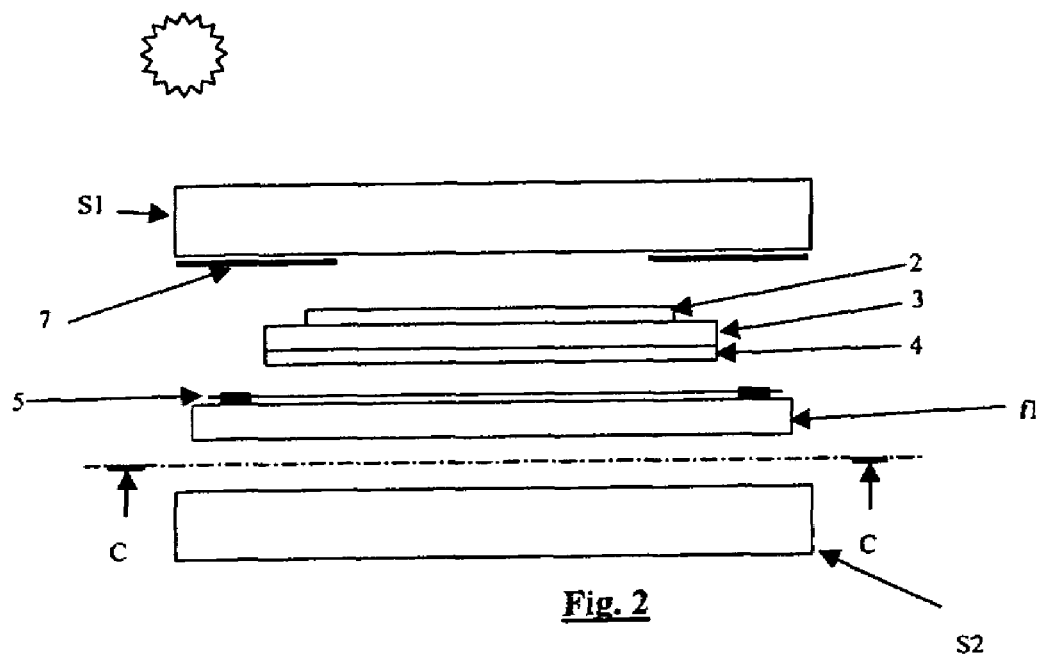
FIG. 2 is a sectional view on AA of FIG. 1.
Figure 3:
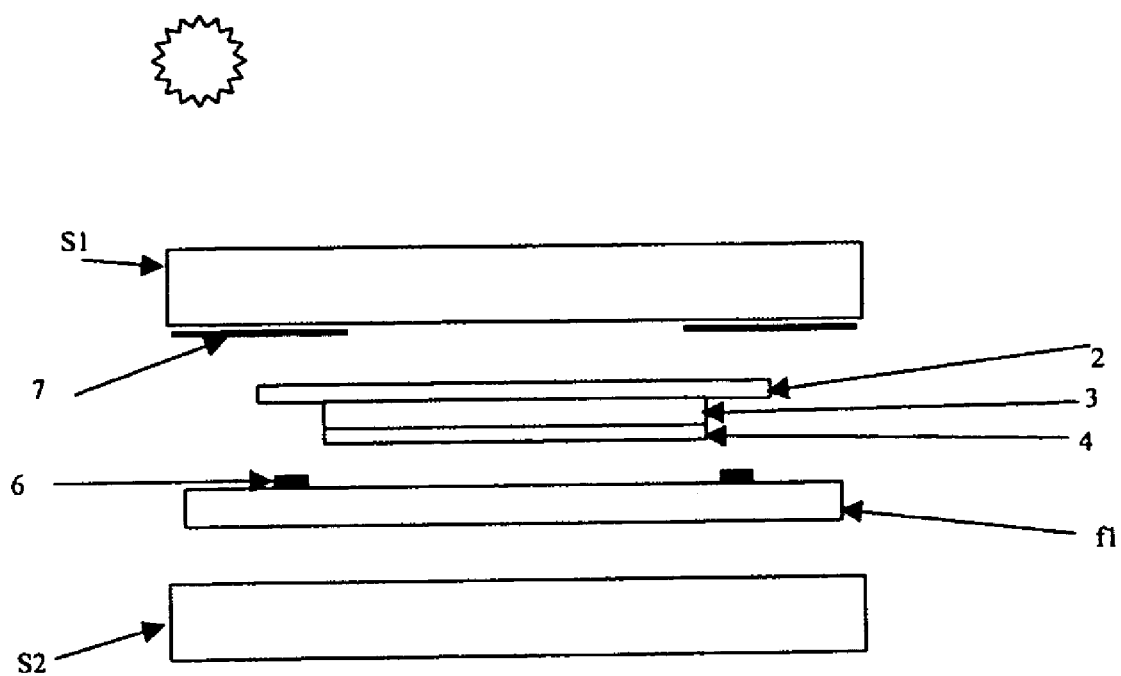
FIG. 3 is a sectional view on BB of FIG. 1.

The active multilayer 3 shown in FIGS. 2 and 3 is made up as follows:

a 40 to 100 nm layer of anodic electrochromic material made of hydrated iridium oxide (it may be replaced with a 40 to 300 nm layer of hydrated nickel oxide), which layer may or may not be alloyed with other metals;

a 100 nm layer of tungsten oxide;

a 100 nm layer of hydrated tantalum oxide or hydrated silica oxide or hydrated zirconium oxide;

a 370 nm layer of cathodic electrochromic material based on hydrated tungsten oxide.

Moreover, the glazing unit shown in FIGS. 1, 2 and 3 incorporates (but not shown in the figures) a first peripheral seal in contact with the faces 2 and 3, this first seal being suitable for forming a barrier to external chemical attack.

A second peripheral seal is in contact with the edge of S1, the edge of S2 and the face 4, so as to produce: a barrier; a means of fitting the unit into the vehicle; a seal between the inside and the outside; an esthetic function; a means of incorporating reinforcing elements.

The substrates used to form the glazing unit, incorporating the electrically controllable system formed in particular by the multilayer 3, are of the type comprising substrates made of glass or of organic material (PMMA, PC, etc.). As examples, it is possible to use, as glass substrates, flat glass sold by Saint-Gobain under the brand name PLANILUX, with a thickness of about 2 mm for motor vehicle applications, and a thickness of substantially 5 mm for building applications.

It is also possible to use curved and/or toughened glass, optionally bulk-tinted (blue, green, bronze or brown).

Of course, these substrates may have a very wide variety of geometrical shapes: they may be squares or rectangles, or more generally still of polygonal shape, or of curved profile defined by rounded or wavy contours.

The current leads are connected, via wire connections or the like, to a power supply, the mode of operation of which is as follows:

an energy potential P is applied between the current leads, this potential being suitable for causing the active species to migrate into the electrically controllable system and for generating a change of state characterized by a change in the optical/energy properties, in transmission or in reflection, of the system.

In the nonlimiting example given (this is an electrochromic system), the active species consist of the electrons coming from the electrodes or counterelectrode and the cations from the electrolyte, the change of state for this type of system being expressed in terms of the color modification, or precisely a reversible switch between a colored state E1 and a bleached state E2.

It will be recalled that, for a change of color state to occur, it is necessary to have alongside the layer of electrochromic material a source of cations and a source of electrons, formed respectively by a layer of an ionically conductive electrolyte and by an electronically conductive layer. In addition, the system includes a counterelectrode, which is itself capable of reversibly injecting and ejecting cations, symmetrically with respect to the layer of electro-chromic material. With a cathodic electrochromic material, such as for example tungsten oxide, it is preferred to use a counterelectrode made of an anodic electrochromic material such as, for example, iridium oxide which is colorless in the reduced state and yellow-gray in the colored state. The cation source is formed by the electrolytic layer of the system, for example based on tantalum or tungsten, and the electron source is formed by the electronically conductive second layer, the two electronically conductive layers forming the two electrodes between which the energy potential difference is applied.

The energy potential P consists in fact of a time-varying electrical potential difference which comprises:
- a constant component P1 or P'1, whose amplitude is constant over time, depending on the state, colored or bleached, this constant component being combined with
- a variable component P2 or P'2, whose amplitude varies over time, depending on the colored/bleached state and vice versa.

As a variant, the energy potentials $P_i$ and $P'_i$ may consist of current, voltage or charge sources, i=1 and/or i=2.

Thus, for example in the case of the electrochromic system described above, a positive voltage P1, of between 0.5 V and 2 V, preferably between 1 and 1.5 V and even more preferably substantially close to 1.2 V, for switching between the colored state and the bleached state and a negative voltage P'1, of between –0.5 V and –3 V, preferably between –1 and –2 V and even more preferably approximately –1.6 V for switching between the bleached state and the colored state are applied for a few seconds between the current leads.

In addition, overvoltages P2 and P'2 are associated with these voltage levels P1 and P'1, respectively:
- P2 is a positive voltage, whose amplitude varies over time, which may be of the pulsed, log(t), (1/t) or at+b form, or may be in the form of a pulsed polynomial $$P(t) = \sum_i a_i \cdot t^i,$$

where $a_i$ is positive or negative, or a linear or nonlinear combination of these forms; and
- P'2 is negative, whose amplitude varies over time, and may take the same form as P2.

Within the context of the invention, the term "pulsed" refers to a voltage P2 that can take the form of a mathematical function, or example of the Heaviside type and expressed in the following form:

$$H(x) = \sum_{i=1}^{n} H(x - x_i) - H(x - x_{i+1}) \text{ where } x_i = i \times t.$$

As a variant, at least one of the potentials P1, P'1, P'2 may also be of the pulsed form and may be expressed in a similar way to P2.

Figure 4:
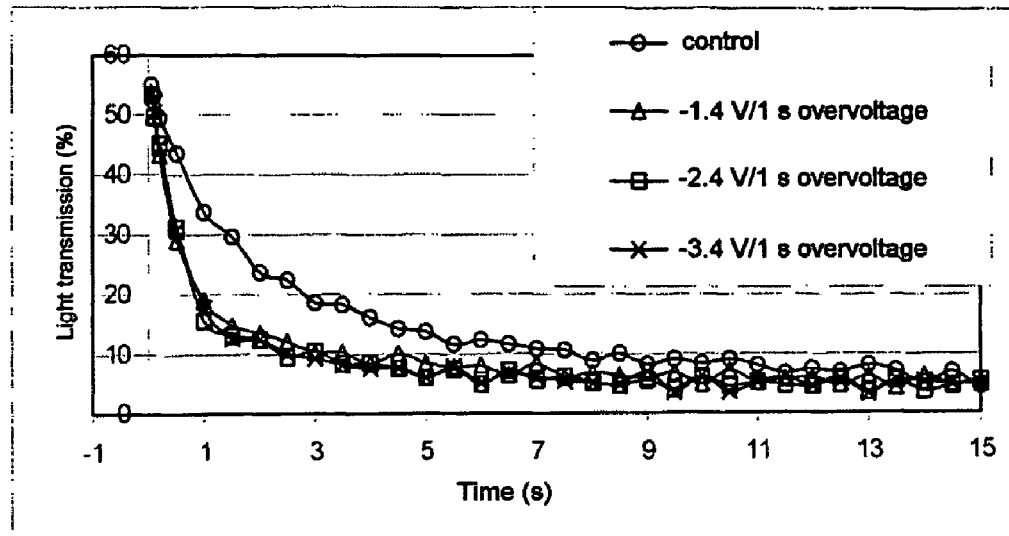
FIG. 4 illustrates the variation in light transmission as a function of time for various potential values P'2.

As illustrated in FIG. 4, several overvoltage levels for P'2 are chosen, to be applied for the same time (1 s), namely –1.4 V; –2.4 V; –3.4 V, respectively. With a –1.4 V level, the light transmission level of around 10% (corresponding to a transition between the bleached state and the colored state) is reached twice as quickly (4 seconds) than in a situation with no overvoltage, i.e. P'2=0 (8 seconds).

It should also be noted that the increase in voltage level is not significant; if the level is too high, this may lead to destruction of the electrically controllable multilayer (appreciable reduction in or even loss of the functional properties).

This is because the overvoltage level P'2 applied is tailored according, on the one hand, to the optimum switching speed of the electrochromic system and, on the other hand, to a limit level or threshold beyond which the multilayer risks being degraded over time (i.e. the durability of the electrically controllable system is optimized).

To prevent this malfunction, before applying the voltage level P'2, this is compared with a level $P'2_{max}$ that represents a threshold voltage beyond which the electrically controllable system risks being damaged.

Figure 5:
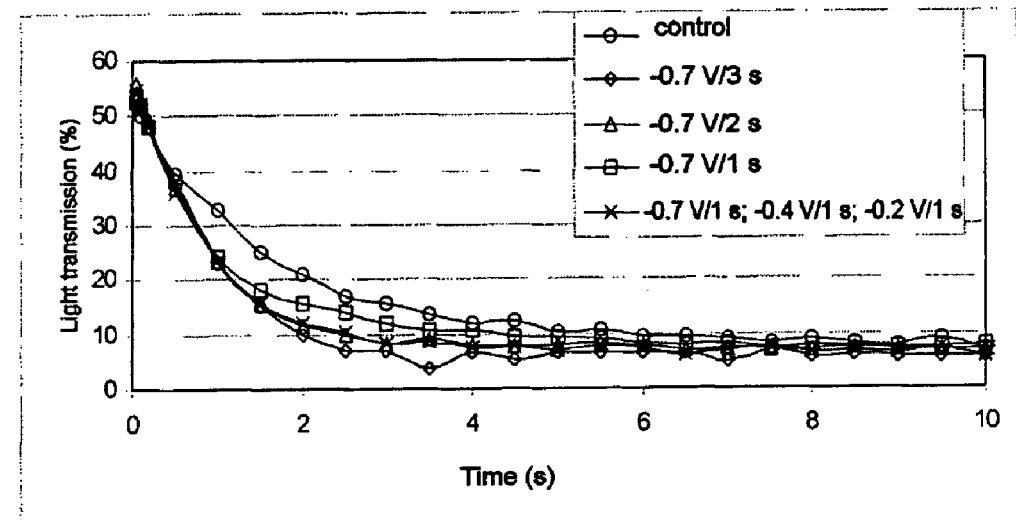
FIG. 5 illustrates the rate at which the change of state occurs for different potential values P'2.

In FIG. 5 the aim is to obtain a light transmission that is substantially similar to the previous case (the same level of $T_L$ obtained after a similar time, i.e. about 4 s). It may be noticed that by applying a –0.7 V pulse for 3 s to P'2, 10% $T_L$ level is obtained, as shown in the table below.

| $T_L$ level (%) | Time to reach x % coloration (s) | | Ratio |
|---|---|---|---|
| | Control | –0.7 V/3 s | |
| 50 | 1.1 (±0.1) | 0.7 (±0.1) | 1.6 |
| 30 | 2.1 (±0.2) | 1.2 (±0.2) | 1.8 |
| 10 | 5.0 (±0.2) | 2.0 (±0.2) | 2.5 |

In a similar way to P'1 and P'2, a positive overvoltage P2 (which is also less than the maximum overvoltage $P1_{max}$) is applied as a complement P1 in order to increase the rate of transition between the colored state and the bleached state).

Thus, with a similar electrically controllable system, by applying a constant voltage P1=1.6 V and then a pulsed overvoltage of P2=0.4 V for 1 second, a similar effect is obtained, namely an increase in the rate of switching during the transition from the colored state to the bleached state (in practice, a gain of around 1.5 to 2 s is achieved for switching from a 40% $T_L$ to a 7% $T_L$).

Of course, the potential difference values given above have been optimized for a nonlimiting example of a multilayer structure, and it will be readily understood that, for another multilayer structure (different dimensions, different electrochromic material, etc.), these values will be different. However, irrespective of the nature of the electrically controllable structure (for example an all-polymer system), the method of supplying it remains valid and it will simply be necessary to adapt the amplitudes and the durations of application of the applied potentials P1, P'1, P2, P'2 (the $P_i$ and $P'_i$ may be positive, negative, zero, of opposite sign and i=1 or 2, taken individually or in combination).

The glazing unit incorporating the electrically controllable system may be applicable either in the automobile field or in the building field. For example, in the automobile field, it may be a sunroof for a vehicle, able to be activated autonomously, or a side or rear window for a vehicle, or a rear-view mirror, or a windshield or a portion of a windshield. In the building field, it may for example be a display panel for displaying graphical and/or alphanumeric information, a window for buildings, an aircraft cabin window or windshield, a skylight, an interior or exterior glazing unit for buildings, a display cabinet, a store counter, which may be curved, a glazing unit for protecting objects of the painting type, an anti-glare computer screen, glass furniture, or a wall separating two rooms inside a building.

The electrically controllable system is activated by a manual actuator, for example a switch positioned in the room or in the automobile (especially on the dashboard), or by means of an actuator or automated detector, optionally controlled and/or time-delayed, taking into account the environmental conditions of the glazing (brightness, glare sensor) in order to be determined. The detector may be controlled by the interior or exterior brightness via a suitable probe. In the case of an interior probe, this may be an ambient light probe or a sensor placed for example on the surface of a desk or on the dashboard. The control signal may also derive from the ratio of a brightness measurement taken inside (for example against the glazing, to a reference measurement). In the latter case, the control circuit includes a signal processing phase. The detector may also be time-controlled or controlled by the value of the electrical potential reached, by the value of the current or by the amount of charge that has flowed.

The invention described above offers many advantages as in particular it allows the switching rate of electrically controllable systems, especially those of the electrochromic type, to be increased while maintaining their durability.

The invention claimed is:

1. A method of supplying an electrically controllable system having variable optical/energy properties in transmission or in reflection, including at least one carrier substrate with a multilayer that allows migration of active species, or an electrochromic multilayer including at least two active layers, which are separated by an electrolyte, the multilayer being placed between two electrodes connected respectively to upper and lower current leads respectively, the method comprising:
applying, a constant first energy potential and a time-varying second energy potential between the current leads, said time-varying second energy potential applied after a first predetermined time until a second predetermined time when said time-varying second energy potential is no longer applied, the first energy potential and the second time-varying energy potential being designed to ensure switching between first and second states having different optical/energy properties in transmission or reflection.

2. The method as claimed in claim 1, wherein the constant first energy potential is defined according to diffusion properties of the active species in the multilayer.

3. The method as claimed in claim 1, wherein the time-varying second energy potential is defined to force migration of the active species into the multilayer.

4. The method as claimed in claim 1, wherein the first energy potential and time-varying second energy potential are applied to switch from the first state to the second state.

5. The method as claimed in claim 1, wherein the first energy potential and time-varying second energy potential are applied to switch from the second state to the first state.

6. The method as claimed in claim 1, wherein the first energy potential and time-varying second energy potential are electrical potentials.

7. The method as claimed in claim 6, wherein the time-varying second energy potential is in pulsed, log(t), (1/t) or a+b form or is in a form of a polynomial $$P(t) = \sum_i a_i \cdot t^i,$$

in which $a_i$ is positive or negative.

8. The method as claimed in claim 6, wherein the first energy potential and time-varying second energy potential are compared with a maximum first energy potential and a maximum time-varying second energy potential, respectively, the maximum first energy potential and maximum time-varying second energy potential being determined as limiting values beyond which the functionality of the system is no longer optimum.

9. The method as claimed in claim 1, wherein the first energy potential and time-varying second energy potential are chosen from voltage, current, or charge sources, taken individually or in combination.

10. The method as claimed in claim 1, wherein the time-varying second energy potential includes at least one constant pulse.

11. The method as claimed in claim 1, wherein the time-varying second energy potential is such that the current or voltage response is constant at any instant and equal to an initially chosen value.

12. The method as claimed in claim 1, wherein the time-varying second energy potential is such that the product of the potential and the current is constant at any instant and equal to an initially chosen value.

13. The method as claimed in claim 1, wherein the time-varying second energy potential is such that the ratio of the potential to the current is constant at any instant and equal to an initially chosen value.

14. The method as claimed in claim 1, wherein the first energy potential and time-varying second energy potential are positive or zero.

15. The method as claimed in claim 1, wherein the first energy potential and time-varying second energy potential are of opposite sign.

16. The method as claimed in claim 1, wherein the first energy potential and time-varying second energy potential are negative or zero.

17. The method as claimed in claim 1, wherein the first energy potential and time-varying second energy potential are of opposite sign.

18. The method as claimed in claim 1, applied to an electrically controllable system of electrochromic type, configured to switch between two states of a colored state and a bleached state, respectively.

19. The method as claimed in claim 1, wherein the first energy potential and time-varying second energy potential are applied between the current leads by a manual actuator.

20. The method as claimed in claim 1, wherein the first energy potential and time-varying second energy potential are applied between the current leads by an automatic actuator optionally coupled to a detector.

21. An electrically controllable system having variable optical/energy properties in transmission or in reflection, including at least one carrier substrate with a multilayer that allows migration of active species, or an electrochromic multilayer including at least two active layers, which are separated by an electrolyte, the multilayer being placed between two electrodes connected respectively to upper and lower current leads respectively comprising:

first energy potential application unit configured to apply a constant first energy potential;

time-varying second energy potential application unit configured to apply a time-varying second energy potential between the current leads, said time-varying second energy potential applied after a first predetermined time until a second predetermined time when said time-varying second energy potential is no longer applied;

a glazing unit configured to darken or lighten when the first energy potential and the second time-varying energy potential switch between first and second states having different optical/energy properties in transmission or reflection, said glazing unit includes a sunroof in a vehicle, or a side window or rear window in a vehicle, or a rear-view window, or a windshield or a portion of a windshield.

22. The system as claimed in claim 21, wherein said glazing unit includes a display panel displaying graphical or alphanumeric information, a window for a building, an aircraft cabin window or windshield, a skylight, an interior or exterior glazing unit in a building, a display cabinet, a store counter, which may be curved, a protection glazing unit protecting painted objects, an anti-glare computer screen, glass furniture, or a wall separating two rooms inside a building or separating two compartments of a motor vehicle.

* * * * *